(12) United States Patent
Krosse et al.

(10) Patent No.: US 8,051,602 B2
(45) Date of Patent: Nov. 8, 2011

(54) SYSTEM FOR CONDITIONING CROPS

(75) Inventors: Luciënne Jozefina Wilhelmina Maria Krosse, Dieren (NL); Nicolaas Richardus Bootsveld, Delden (NL)

(73) Assignee: Nederlandse Organisatie Voor Toegepast-Natuurwetenschappelijk Onderzoek TNO, Delft (NL)

( * ) Notice: Subject to any disclaimer, the term of this patent is extended or adjusted under 35 U.S.C. 154(b) by 655 days.

(21) Appl. No.: 12/092,340

(22) PCT Filed: Nov. 2, 2006

(86) PCT No.: PCT/NL2006/000547
§ 371 (c)(1),
(2), (4) Date: Oct. 20, 2008

(87) PCT Pub. No.: WO2007/053011
PCT Pub. Date: May 10, 2007

(65) Prior Publication Data
US 2009/0077875 A1    Mar. 26, 2009

(30) Foreign Application Priority Data
Nov. 2, 2005  (EP) .................................. 05077511

(51) Int. Cl.
*A01G 9/24* (2006.01)
(52) U.S. Cl. ............................................... 47/17; 47/60

(58) Field of Classification Search ................ 47/17, 60, 47/61, DIG. 12; 62/91–94, 271, 309
See application file for complete search history.

(56) References Cited

U.S. PATENT DOCUMENTS

| | | | | |
|---|---|---|---|---|
| 1,827,530 A * | 10/1931 | Le Grand | ........................ | 600/21 |
| 4,567,732 A * | 2/1986 | Landstrom et al. | ............... | 62/91 |
| 5,001,859 A * | 3/1991 | Sprung | ............................. | 47/17 |
| 5,299,383 A | 4/1994 | Takakura et al. | | |
| 5,392,611 A * | 2/1995 | Assaf et al. | ........................ | 62/94 |
| 6,725,598 B2 * | 4/2004 | Yoneda et al. | .................... | 47/60 |
| 7,565,768 B2 * | 7/2009 | Bula | ................................... | 47/89 |
| 2003/0005626 A1 * | 1/2003 | Yoneda et al. | .................... | 47/69 |
| 2004/0194371 A1 * | 10/2004 | Kinnis | ............................. | 47/17 |

FOREIGN PATENT DOCUMENTS

| | | |
|---|---|---|
| EP | 0 476 929 A | 3/1992 |
| JP | 407108127 A * | 4/1995 |
| WO | 2004/045272 A | 6/2004 |

* cited by examiner

*Primary Examiner* — T. Nguyen
(74) *Attorney, Agent, or Firm* — Lucas & Mercanti, LLP

(57) ABSTRACT

System for conditioning crops e.g. in a greenhouse, comprising climate control means which are arranged for providing a local microclimate area around the relevant crop, which climate control means comprising first means at a first location close to the crop, which are arranged for local humidification and simultaneous cooling or heating the local microclimate area, as well as second means at a second location close to the crop, which are arranged for dehumidification and simultaneous cooling or heating the local microclimate area.

12 Claims, 2 Drawing Sheets

Figure 1:
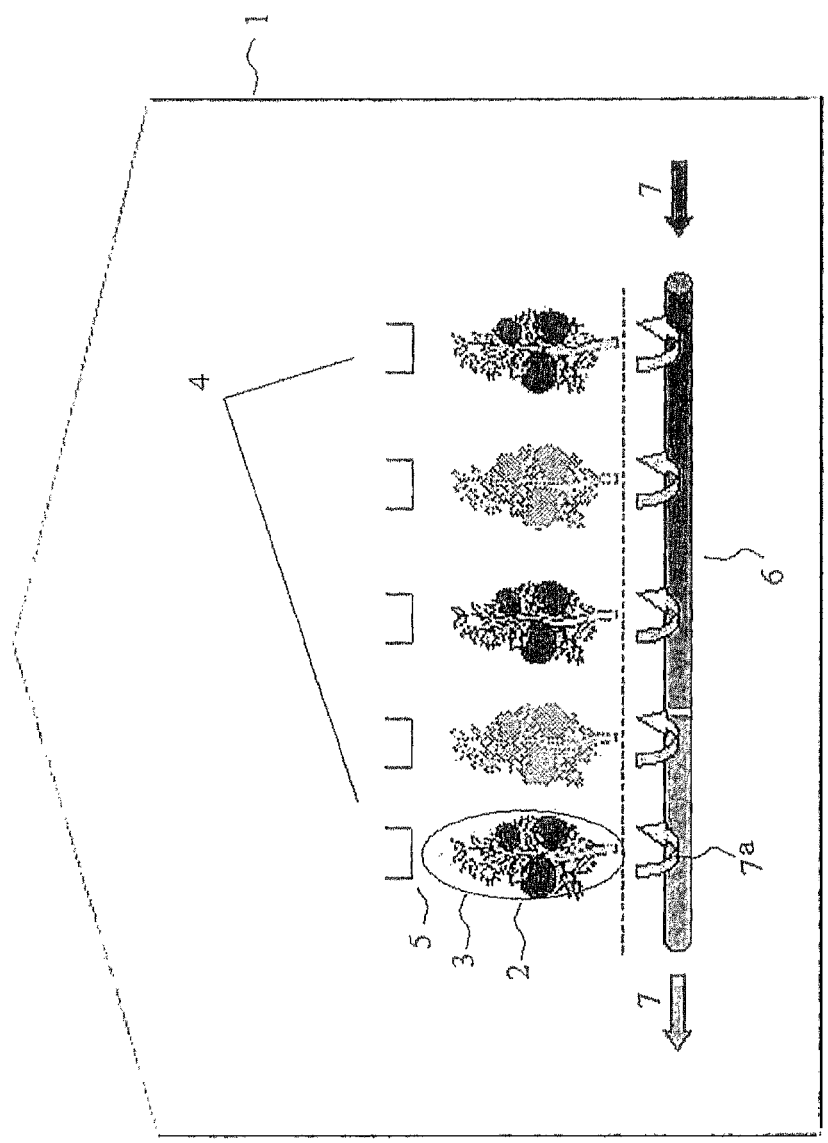

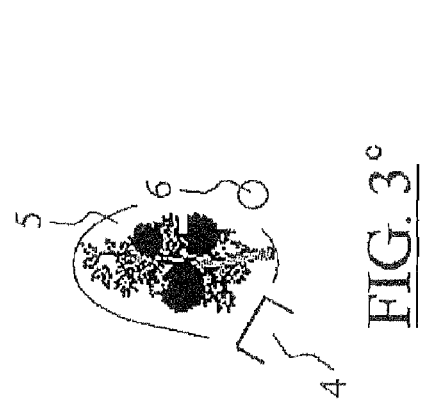
FIG. 3b
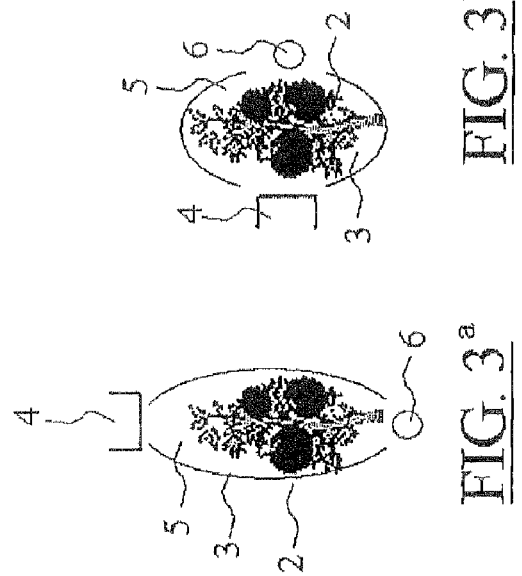
FIG. 3a
FIG. 3c
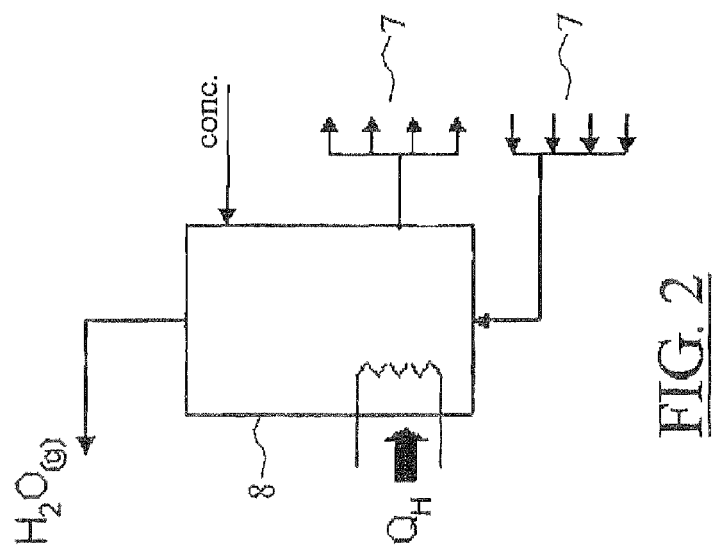
FIG. 2

SYSTEM FOR CONDITIONING CROPS

FIELD

The invention refers to a system for conditioning—providing for a good climate—crops e.g. in a greenhouse.

BACKGROUND

Greenhouses have been developed and introduced in the Netherlands for three reasons: 1) to be able to cultivate crops that can not be cultivated in the Dutch climate, 2) to give a longer cultivation season to full land crops, 3) to be able to guarantee a more controllable quality. The conditioning of the greenhouse is essential: temperature, atmospheric humidity and CO2 concentration determine, together with the supply of light, the quality and quantity of a crop. Because of the different requirements regarding the indoor climate, per crop considerable differences in the applied fitting techniques are possible.

Basic equipment consists of the central generation of heat and CO2 by means of boilers. The heat is distributed through pipes, which also serve the internal transport system. Moisture is brought in by the crop and provides in summer for the cooling of the greenhouse, combined with the ventilation through the opening of the windows. Ventilators suspended from the greenhouse construction provide here for a better distribution of the conditions. In addition to the use of energy of the ventilators, this has also consequences for the greenhouse construction. The greenhouse construction must be carried out heavier (and thus more expensive), because it also serves as supporting construction for the ventilators and the windows to be opened.

At the moment, it is not possible to operate/control the temperature, atmospheric humidity and CO2 concentration independently from one another. Dehumidification of the greenhouse takes for example place by simply opening windows. The greenhouse is herewith not only de-moisturized, but the CO2 also disappears and the optimal greenhouse temperature gets disturbed. An additional disadvantage is the possible contamination from the surroundings (insects, diseases, etc.).

In modern greenhouse farming the "Innogrow" concept is generally known. In this concept the air is demoisturized by first cooling it and then partially heating it again. The cool, dry air is distributed by large textile hoses under the crop. A direct result is that enormous quantities of air have to be moved by means of ventilators. The length of the production line is furthermore limited, because a larger production line requires the air hose to have a larger diameter. The tendency goes towards production lines that are as long as possible. The generation of cold and heat takes place by means of heat pumps and storage of energy in the soil. It is important that the concept consists of a heat surplus and that it can only be realized by placing a conventional greenhouse adjacent to it.

SUMMARY

The invention aims to present an improved system for conditioning crops e.g. in a greenhouse, comprising climate control means which are arranged for providing a local microclimate area around the relevant crop, which climate control means comprise first means at a first location with regard to the crop, which are arranged for local humidification and simultaneous cooling or heating the local microclimate area, as well as second means at a second location with regard to the crop, which are arranged for dehumidification and simultaneous cooling or heating the local microclimate area.

An aspect of the invention is to provide a system for conditioning crops e.g. in a greenhouse comprising climate control means which are arranged for providing a local microclimate area around the relevant crop, which climate control means comprise first means at a first location close to the crop, which are arranged for local humidification and simultaneous cooling or heating the local microclimate area, as well as second means at a second location close to the crop, which are arranged for dehumidification and simultaneous coding or heating the local microclimate area, said first means comprising one or more vapor outlets which are arranged to create a foggy or vaporous climate around the relevant crop in the local microclimate area, said one or more vapor outlets being connected with third means which are arranged to provide that the relevant vapor outlets remain in line with the growing level of the crops, said second means comprising a duct system which is arranged to guide a hygroscopic liquid flow, which duct system and hygroscopic liquid flow are arranged to absorb and remove either moisture surplus or heat surplus or both from the local microclimate area, said duct system comprising one or more hoses or tubes which are porous or permeable for water vapor, wherein the first means and second means being located at mainly opposite locations with regard to the crop.

One important aspect of the present invention is that lowering down the temperature in a greenhouse by means of evaporation of liquid (water) only has been possible by making use of the gap between the actual relative moisture and the maximum admissible moisture. In other words, this only can be applied at dry climate circumstances, e.g. in the south of Spain or in Arizona (US). In the present inventive configuration those dry circumstances—needed for said cooling effect of evaporating water—are created deliberately. Those dry circumstances are created by abstracting moisture and heat at one side of the crops, e.g. at the bottom level of the greenhouse, viz. by means of the second means, operating e.g. under the crops, thus enabling a good cooling performance of the first means, operating at the other side of the crops, e.g. at the top-of-the-crop level.

It is noted that in general it is sufficient to have the first means and the second means located in the neighborhood of the crop, to provide a microclimate around it. It may be preferred that the first means and second means are located at mainly opposite locations with regard to the crop. It may be even more preferred to have the first means located mainly at the top of the crop and the second means mainly at the bottom side—or even under—of the crop.

Preferably, said first means may comprise one or more vapor outlets—e.g. a vapor nozzle or (e.g. ultrasonic) vapor pad—which are arranged to create a foggy or vaporous climate around the relevant crop in the local microclimate area. To realize that the first means are always operating in line with the grow level of the crop, the vapor outlets preferably are connected with third means which are arranged to provide that the relevant vapor outlets remain in line with the growing level of the crops.

Preferably the second means are arranged for local dehumidification and simultaneous cooling or heating the local microclimate area.

The second means preferably comprise a duct system which is arranged to guide a hygroscopic liquid flow, which duct system and hygroscopic liquid flow are arranged to absorb and remove either moisture surplus or heat surplus or both from the local microclimate area. The duct system may comprise hoses or tubes which are porous or permeable for water vapor, without letting through the hygroscopic liquid, flowing through them. The duct system may, alternatively, comprise an open channel system.

Besides for dehumidification—resulting in the desired dry climate which is a "conditio sine qua non" for simultaneous cooling the microclimate areas during—and due to—humidification (by spraying or vaporizing water) performed by the first means, the second means may additionally be arranged for local humidification and simultaneous cooling or heating the local microclimate area, by which measure the moisture and temperature control dynamics can even be improved.

Fourth means may be arranged to control the degree of dehumidification or humidification by varying either the concentration or the temperature of the hygroscopic liquid or both, while fifth means may be arranged to regenerate the hygroscopic liquid.

Features of the new concept are:
Local conditioning at the crop
Separation of the functions heating, cooling, humidification, dehumidification and CO2 fertilization
Transport of heat and moisture with hygroscopic liquids instead of air
Semi-closed greenhouse
Withdrawal of heat with hygroscopic liquids (large heat content, $mC_p$, many times larger than heat content of air)

The invention is discussed further below using some illustrative figures.

EXEMPLARY EMBODIMENT

FIG. 1 and FIG. 2 together show an embodiment of the present invention

FIGS. 3a, 3b and 3c show different embodiment details, viz. alternative locations of the first and second means, providing the microclimate around the crops.

FIGS. 1 and 2 show a system for conditioning crops 2 in a greenhouse 1, comprising climate control means 4-8 which are arranged for providing a local microclimate area 3 around the crop. The climate control means comprise first means 4 which are located at the top of the crop 2 and which are arranged for local humidification 5 and simultaneous cooling—or heating—the local microclimate area 3, as well as second means 6-7 which are located under the crop and which are arranged for local dehumidification 7a and simultaneous cooling or heating the local microclimate area.

In FIG. 1 the first means formed by vapor outlets 4 which are arranged to create a foggy or vaporous climate 5 around the crop in the local microclimate area 3. The vapor outlets 4 may be mounted on third means, e.g. a vertically movable frame—e.g. controlled by servo motors and a greenhouse computer system—, arranged to provide that the vapor outlets 4 remains in line with the growing level of the crops 2

In the embodiment of FIG. 1 the second means comprise a duct system 6, arranged to guide a hygroscopic liquid flow 7, which duct system 6 and hygroscopic liquid flow 7 are arranged to absorb 7a and remove either moisture surplus or heat surplus or both from the local microclimate area. The duct system may contain hoses or tubes 6 made of a material which is porous or permeable for water vapor, thus enabling said moisture absorption 7a. As an alternative the duct system could comprise open channels.

Alternatively, the second means comprise a local heat exchanger placed close to a crop for local dehumidification of the local microclimate of the crop.

The second means 6-7 may—if necessary—additionally be arranged for local humidification and simultaneous cooling or heating the local microclimate area, viz. by varying—by means of fourth means 8 (FIG. 2)—either the concentration or the temperature of the hygroscopic liquid or both. Those means 8 could additionally be to regenerate the hygroscopic liquid.

In the embodiment shown in FIGS. 1 and 2 a microclimate is created by humidification, cooling or—if necessary—heating at the top of the crop 2 and by dehumidification—or, if necessary, humidification, cooling or heating—under the crop. A preferred embodiment for the humidification and cooling at the same time can be by putting at the top of crop a frame of vapor outlets 4 through which a fog 5 can be created. On the one hand the air becomes moisturized in this way, on the other hand the fog drops evaporate into the air around the crop, so that it gets cooled.

The necessary dehumidification then takes place under the crop. The hygroscopic liquid flowing through the ducts 6 provide that the moisture gets absorbed 7a and removed to the regenerator/heater 8. Besides porous hoses or open ducts, a system may be used with membrane contactors. The degree of dehumidification can be regulated by varying both the concentration and the temperature of the hygroscopic liquid in module 8.

During the dehumidification 7a, heat is created. This heat is removed directly by means of the hygroscopic liquid flow. This removal of moisture and heat by means of a liquid flow 7 is many times more effective than e.g. removal by air: smaller flows, less volume and less energy are needed.

For regeneration and—if desired—heating of the hygroscopic liquid 7 in module 8 different sources may be used, e.g. gas, rest heat or renewable sources.

An additional advantage of the local dehumidification by means of a hygroscopic liquid is that the same system can be used for humidification too. For this, the concentration of the hygroscopic liquid can be varied ("conc.") in module 8.

In the dehumidification state the hygroscopic fluid flows with a low degree of moisture load through the ducts 6 which are pervious to vapor. Because of the difference in partial water vapor pressure between the greenhouse 1 and the hygroscopic fluid, the water vapor flows from the greenhouse to this hygroscopic fluid, after which it gets absorbed.

In the humidification state the hygroscopic fluid flows with a high degree of moisture load through the porous ducts 6. In this case the partial water vapor pressure above the hygroscopic fluid is just higher than in the greenhouse 1, by which moisture will evaporate from the hygroscopic fluid to the greenhouse, thus moisturizing the greenhouse. By, among other things, the choice of the hygroscopic fluid, the degree of moisture load and the temperature of the liquid, the humidity in the greenhouse can be kept at a certain constant level.

FIGS. 3a, 3b and 3c show different locations of the first means 4 and second means 6, providing together the microclimate 3 around the crops 2. FIG. 3a is a cross-sectional view of the embodiments shown in FIG. 1, comprising a vapor outlet 4 close to the top of the crop 2, while a duct 6 extends under a row of crops 2. In FIG. 3b fog environment 5 is generated by a vapor outlet 4 which located at one side of the crop 2, while the duct 6—guiding a hygroscopic fluid flow—extends along the crop 2 at the other side, thus providing the desired microclimate around the crop 2. Finally, in FIG. 3c both, the first means 4 and the second means 6 are located around the bottom side of the crop 2. Which locations for the first and second means are preferred may depend on the grow characteristics of the relevant crops e.g. with regard to the location of the microclimate area.

Advantages of the new configuration compared to prior art technology are:

Less volume needed because of the larger heat content per volume unit of liquids compared to air.

Increased incidence of light; fewer heavy window constructions and ventilators in the roof of the greenhouse that take away light. In this way, the production yields will increase.

In the absence of windows that can be opened and the absence of large ventilators, lighter and cheaper greenhouse constructions become possible.

Less use of energy and thus reduction of costs of production (a very large part of the costs in greenhouse farming are costs due to use of energy).

No windows need to be opened to transport the moisture, which on the one hand minimizes the risk of contamination from the open air (insects, diseases, etc.). On the other hand, it is possible in this way to maintain the CO2 concentration in the greenhouse at an higher level, which will increase the yields.

The invention claimed is:

1. A system for conditioning crops in a greenhouse, comprising:
    climate control means which provides a local microclimate area around one of the crops selected for conditioning, the climate control means comprise:
        a first means at a first location, close to the one of the crops, for local humidification and simultaneous cooling or heating of the local microclimate area, the first means having one or more vapor outlets creating a foggy or a vaporous climate around the one of the crops in the local microclimate area,
        a second means at a second location, opposing the first means, close to the one of thecrops, for dehumidification and simultaneous cooling or heating the local microclimate area, the second means having a duct system with one or more hoses or tubes, which are porous or permeable for water vapor that guides a hygroscopic liquid flow, the duct system and the hygroscopic liquid flow absorb and remove either moisture surplus or heat surplus or both the moisture surplus and the heat surplus from the local microclimate area, and
        a third means, which ensures that the one or more vapor outlets remain in line with the a growing level of the crops.

2. A system for conditioning multiple crops adjacent to each other in a greenhouse, comprising: climate control means, which provides a local microclimate area around one of the crops selected for conditioning, the climate control means comprises a first means arranged at a first location, close to the one of the crops, for local humidification and simultaneous cooling or heating of the local microclimate area, and a second means, which has a duct system for guiding a hygroscopic liquid flow, arranged at a second location close to the one of the crops, for dehumidification and simultaneous cooling or heating the local microclimate area.

3. The system according to claim 2, wherein said first means has one or more vapor outlets which create a foggy or vaporous climate around the one of the crops in the local microclimate area.

4. The system according to claim 3, wherein said one or more vapor outlets are connected with a third means which ensures that the vapor outlets remain in line with a growing level of the crops.

5. The system according to claim 2, wherein the hygroscopic liquid flow absorbs and removes either moisture surplus or heat surplus or both moisture surplus and heat surplus from the local microclimate area.

6. The system according to claim 5, wherein said duct system has one or more hoses or tubes which are porous or permeable for water vapor.

7. The system according to claim 1, wherein said duct system has an open channel system.

8. The system according to claim 1, wherein said second means are additionally arranged for local humidification and simultaneous cooling or heating of the local microclimate area.

9. The system according to claim 4, further comprising a fourth means, which controls a degree of dehumidification or humidification by varying either a concentration or a temperature of the hygroscopic liquid or both the concentration or the temperature of the hygroscopic liquid.

10. The system according to claim 1, further comprising fifth means, which are arranged to regenerate the hygroscopic liquid.

11. The system according to claim 2, wherein the crops are arranged between the first means and second means such that the first means and the second means substantially oppose each other.

12. The system according to claim 1, wherein the first means is located mainly at above the crops and the second means is located mainly at beneath the crops.

* * * * *